June 24, 1930.  A. M. GOODLOE  1,765,720
AIR AND GAS FILTER
Filed June 17, 1926  2 Sheets-Sheet 1

INVENTOR
Alfred M. Goodloe
BY
his ATTORNEY

June 24, 1930.　　　A. M. GOODLOE　　　1,765,720
AIR AND GAS FILTER
Filed June 17, 1926　　　2 Sheets-Sheet 2
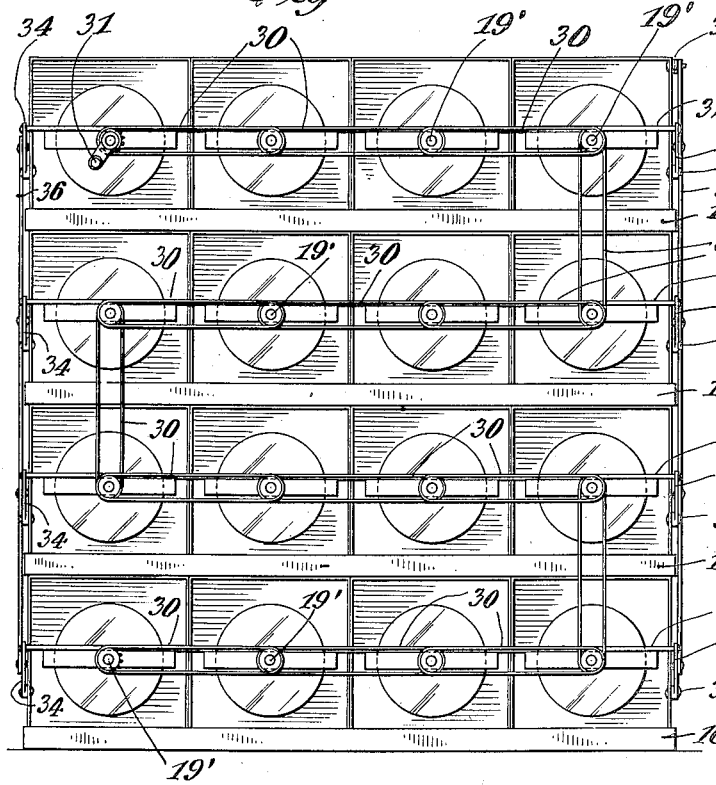
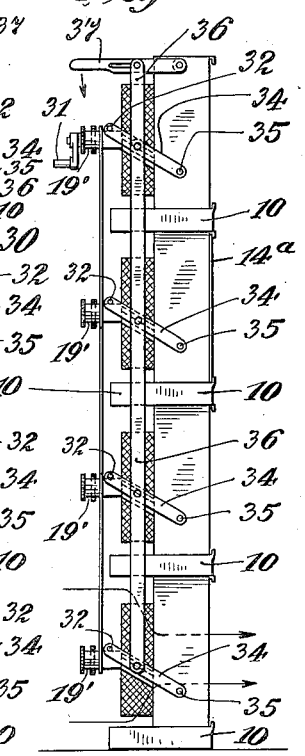
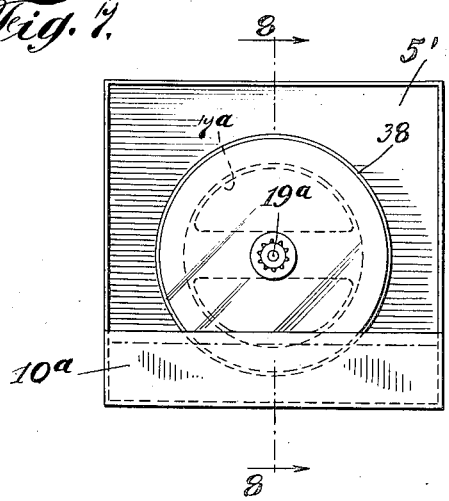
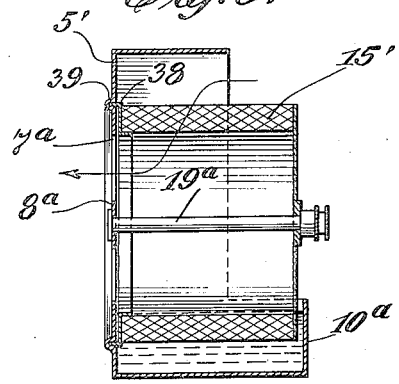
INVENTOR
Alfred M. Goodloe
BY
his ATTORNEY Patented June 24, 1930

1,765,720

UNITED STATES PATENT OFFICE

ALFRED M. GOODLOE, OF BRADFORD, PENNSYLVANIA, ASSIGNOR, BY MESNE ASSIGNMENTS, TO AMERICAN AIR FILTER COMPANY, INC., OF LOUISVILLE, KENTUCKY, A CORPORATION OF DELAWARE

AIR AND GAS FILTER

Application filed June 17, 1926. Serial No. 116,596.

This invention relates to air and gas filters, and more particularly to a unit filter construction wherein means is provided for enabling the filter medium to be periodically cleaned and provided with a surface coating or film of an adhesive agent.

My present improvements are particularly concerned with a revolving drum type of filter and have for their primary object to provide improved means for mounting the filtering drum whereby said drum may be displaced from its normal operating position and the filtering medium carried thereby immersed in a cleaning and coating bath of adhesive liquid such as oil or other suitable liquid.

It is also a further object of the invention to provide a rotary drum type of filter unit of such construction that a multiplicity of such units may be arranged in group formation, together with means for simultaneously displacing all of the filtering drums from their operative positions so that the filtering material is immersed in the cleaning liquid, and means for simultaneously rotating or revolving all of the drums of said filter units.

It is also a further object of the invention to provide a drum type filter unit of such construction that a suitable shutter may be readily applied thereto to cut off the passage of air through the filter unit frame while the filter drum is being cleaned.

With the above and other objects in view, the invention consists in the improved air or gas filter and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Fig. 5 is a front elevation showing a group arrangement of the filter units;

Fig. 6 is a side elevation thereof;

Fig. 7 is an enlarged front elevation of a modified form of the unit having a permanently mounted filter drum, and Fig. 8 is a vertical sectional view taken on the line 8—8 of Fig. 7.

Figure 1:
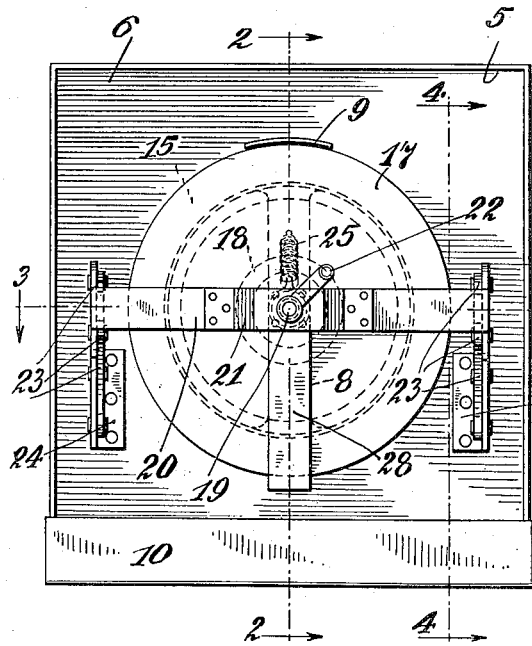
Figure 1 is a front elevation of a filter unit disclosing one embodiment of my present improvements.

Referring in detail to the drawings, the supporting frame upon which the rotary or revolving filter drum is mounted is preferably in the form of a rectangular sheet metal structure indicated generally as 5. This frame at its front side is open and is provided with a rear wall 6 having an opening 7 therein and a web 8 preferably integral with said wall extending diametrically across said opening. Above this opening and on the front side of the frame wall 6 a lip or flange 9 is provided for a purpose which will hereinafter appear.

At its lower end the frame 5 is suitably secured to a trough or container 10 for the cleaning and coating liquid indicated at 11. The rear wall of this trough at its upper edge is provided with an offset upwardly projecting flange 12 and the frame 5 at its upper end and at the rear side thereof has a similar flange or lip 13. These flanges or lips provide guides to receive a closure or shutter plate as indicated by the dotted line 14 in Fig. 2 whereby the opening 7 in the frame wall 6 may be closed to prevent the passage of air therethrough. This plate may be so constructed and more or less closely confined against the rear side of the wall 6 so that a practically air tight closure of the opening 7 is secured.

The rotary filtering drum 15 may be of any preferred detailed construction and embodies an annular holder having inner and outer foraminous walls for the filtering material indicated at 16. The forward end of this drum is closed by the imperforate metal plate 17 to the inner side of which the bracket member 18 is secured. In this bracket member one end of the shaft 19 is suitably fixed, said shaft extending through the plate 17 and being journalled in the bar 20 and the bearing bracket 21 fixed to said bar. The other end of the shaft is provided with a suitable operating handle 22.

To each end of the bar 20 a pair of links 23 are pivotally connected at one of their ends, said links being disposed exterior of the drum 15 and having their other ends pivotally mounted upon brackets 24 fixed to the rear wall 6 of the frame 5. The drum 15 is normally supported in a stationary operative position by means of a coil spring 25 which has one of its ends attached as at 26 to the frame bar 8 and has its other end attached as at 27 to the bracket 18. As indicated in the drawing, the ends of the spring 25 have a loose pivotal engagement in apertured ears at 26 and 27 so that in the rotation of the drum, as the end of the spring at 27 moves above and below the axis 19, in the slight variation in the angular relation between the spring 25 and said axis, the ends of the spring will have a corresponding angular movement relative to the parts with which they are connected so that the spring ends will not be twisted and broken. This spring yieldingly holds the drum in a raised position with its rear end engaged against the under side of the stop flange or lip 9 on the frame wall 6.

To the bar 20 a depending stop bar 28 is secured at its upper end and is adapted to engage the bottom wall of the trough 10 to limit the downward movement of the drum 15 from its normal operating position.

Figure 2:
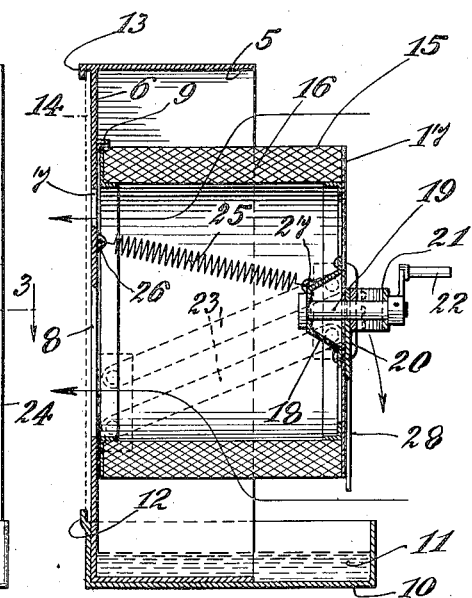
Fig. 2 is a vertical sectional view taken substantially on the line 2—2 of Fig. 1.
Figure 3:
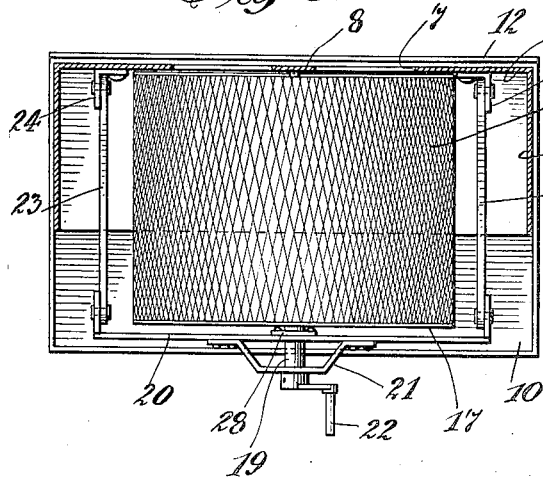
Fig. 3 is a horizontal section taken on the line 3—3 of Fig. 1, the filter drum being shown in elevation.
Figure 4:
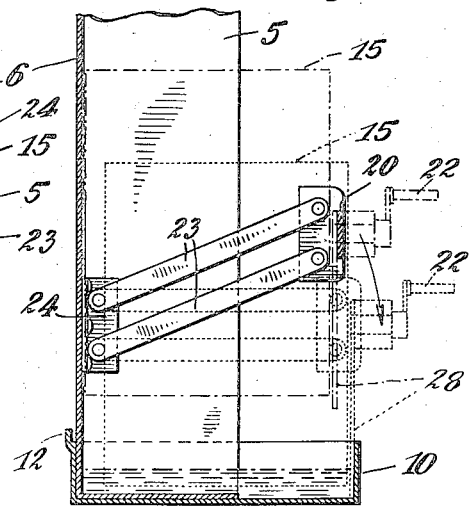
Fig. 4 is an enlarged vertical sectional view taken on the line 4—4 of Fig. 1.

From the above description, it will be seen that while the drum 15 is in the position shown in Fig. 2, the air flowing in the direction indicated by the arrows passes inwardly through the filtering material 16 to the inner side of the drum and hence through the opening 7 of the filter frame. The filtering material 16 may be of any desired nature, but is preferably in the form of metal strands coated with an adhesive solution so that in the passage of the air through said filtering material, all dust and other foreign matter will be removed therefrom so that the air is thoroughly cleaned.

When it becomes necessary from time to time to remove the accumulated dust from the filtering material, this material may be easily and quickly cleaned by moving the drum 15 from its normal position forwardly and downwardly so that the lower portion of said drum will be submerged in the liquid 11 contained in the trough 10. By then rotating the drum several times all of the filtering material may be moved through the cleaning liquid, which as above stated, is preferably in the form of an oil or other adhesive solution so that said material is thereby cleaned and the adhesive coating on the surfaces thereof is at the same time renewed.

In the operation and use of such drum type filters in series or groups, it is desirable to thus clean the several filter drums without interruption of the continued operation of the apparatus, particularly in large group installations such as are used in power plants and other similar cases. This may be readily done simply by first applying the shutters or closure plates 14 successively to the rear sides of the filter unit frames so that the individual filter drum may be displaced from its operating position to the cleaning position without liability of the passage of unfiltered air while the other units remain in operation.

In Fig. 5 of the drawings I have illustrated such a group installation of the filter units provided with suitable means whereby all of the filtering drums may be simultaneously displaced from their operating positions and cleaned. To this end, the filter units are arranged in a plurality of superimposed horizontal series, with a liquid containing trough positioned between the successive series of units and beneath the lowermost series thereof. The drum shafts 19' in this case are provided with suitable sprockets with which the endless chains 30 are engaged. The drum shaft of one filter unit is provided with a suitable operating handle 31 so that by the actuation thereof and through the medium of the chains 30, all of the filter drums will be simultaneously rotated.

Various means may be provided for displacing and lowering the filter drums into the cleaning liquid, and for this purpose, I have herein illustrated rods 32 extending horizontally above the bearing brackets for the drum shafts 19' of each horizontal row of filter units, said rods at their ends being mounted in the links 34 pivoted as at 35 upon the frame walls of the end filter units in the row. These links at one side of the group of filter units are connected intermediate of their ends with the vertically extending bar 36 which is connected at its upper end with an operating lever 37. From this arrangement, it will be evident that by moving the lever 37 downwardly, all of the filter drums together with the operating chain connections 30 will be lowered at the same time into the cleaning liquid contained in the several troughs. By then operating the handle 31, the drums are simultaneously rotated whereby the filtering material is cleaned in the manner above explained. In such group installations of the filter units, I will preferably provide suitable means for circulating the cleaning liquid through the troughs 10 such as a supply tank and a discharge tank, together with supply and discharge piping having suitable valves and a strainer or cleaner for the liquid to remove the collected dirt therefrom. This liquid circulating system may be similar to that in the pending application of Anders Jordahl, filed May 6, 1926, Serial No. 107,118.

In such grouped arrangements of the filter units, I may also provide a permanent mounting of the filter drums and continuously rotate the individual drums in a bath of cleaning liquid while at the same time said drums continue to function as air filters. I have illustrated a filter unit of this type in Figs. 7 and 8 of the drawings, wherein the drum 15' is permanently supported for rotation with respect to the frame 5', the drum shaft 19ª having its rear end journalled in the horizontal web 8ª extending across the egress opening 7ª for the clean air in the rear wall of said frame. In this case, the annular cylindrical holder for the filtering material is provided at its rear end with a flange 38 which is rotatably engaged in a groove 39 formed in the rear wall of the frame 5' and which provides substantially an air tight connection therewith while permitting of a relatively free rotating movement of the drum. The forward end of the drum is provided with the chain engaging sprockets as in Fig. 5. The lower side of this drum 15' extends downwardly into the bath of the cleaning fluid contained in the trough 10ª. Therefore, in this case, it will be understood that these units may be conveniently arranged in a grouped formation as in Fig. 5 and the drums 15' continuously rotated while the air is being filtered, the filtering material of each drum being thus continuously passed through the cleaning fluid so that said material will at all times be maintained at its highest efficiency. However, it will be understood that if desired instead of continuously rotating the drums 15', they may normally remain stationary and be rotated in the cleaning liquid at desired intervals to remove the collected dust and dirt from the filtering material.

As indicated in Fig. 6 of the drawings, in the group arrangement of the filter units, a single closure plate 14ª may be provided for each horizontal row of the filter units, as in this case wherein all of the filter drums are simultaneously displaced from their operating positions, it is necessary to temporarily interrupt the filtering operation and cut off the passage of air completely during the cleaning operation.

From the foregoing description considered in connection with the accompanying drawings, the construction and manner of operation of the several illustrated embodiments of the invention will be clearly and fully understood. It will be seen that I have provided simple and efficient means for quickly and thoroughly cleaning drum type filters, which does not require the complete removal of the drum from the installation, and which will necessitate interruption of the filtering operation of the individual unit for a minimum length of time. In the construction as illustrated in Fig. 2, it is only necessary for the operator to press the bar downwardly with the left hand to lower the drum into the cleaning liquid, and then use the right hand for turning the handle 22. Promptly upon the release of pressure on the bar 20 the filter drum is automatically returned to its normal operating position by the spring 25. While the construction illustrated is believed to be entirely practical for the purpose in view, it will be understood that such disclosure is merely suggestive and the filter drum might be mounted and arranged in various other ways for movement from its operating position as a filter to the position for rotation in the cleaning liquid. Also, it is apparent that various other details of construction as illustrated and described herein might be incorporated in numerous other alternative forms. Accordingly, I reserve the privilege of incorporating the essential features of the invention in all other structural embodiments thereof as may be fairly considered within the spirit and scope of the appended claims.

I claim:

1. In air filter apparatus, a filtering drum, a container for cleaning liquid arranged beneath said drum, means for yieldingly sustaining the drum in a normal operating position and permitting of its displacement therefrom to submerge the lower portion of the drum in the liquid in said container, and means for rotating the drum.

2. In air filter apparatus, a filtering drum, a container for cleaning liquid arranged below said drum, means supporting said drum for bodily vertical movement, means yieldingly resisting such movement and sustaining the drum in a normal stationary operating position but permitting of the bodily displacement of the drum to submerge the filtering material in the cleaning liquid, and means for rotating the drum in the latter position thereof.

3. In filter apparatus, a frame having a wall provided with an opening therein and a liquid containing trough below said opening, a filtering drum open at one end, means supporting said drum for vertical bodily movement in the frame, a spring connected with said frame and the drum to yieldingly hold the drum in a normal operating position with its open end opposed to the opening of the frame but permitting downward movement of the drum from such position into the cleaning liquid, and means for rotating the drum in the latter position thereof.

4. In air filtering apparatus, a frame provided with an opening in one wall thereof and a container for cleaning liquid below said opening, a filtering drum, means for supporting said drum upon said frame wall for vertical bodily movement with respect thereto, a stop on said frame wall, a spring connected with the frame and drum and normally holding the latter in engagement with said stop and in registration with the opening in the frame wall, said drum adapted to be bodily displaced from such position against the action of said spring and engaged in the cleaning liquid, and means for rotating said drum in the latter position thereof.

5. In air filter apparatus, a frame having a wall provided with an opening therein and a trough for cleaning liquid arranged beneath said opening, a filtering drum, link members pivotally mounted on the frame and supporting said drum for vertical bodily movement with respect thereto, said drum being open at one end, a spring connected with the frame and the drum to normally hold the latter in its operating position with the open end thereof opposed to the opening in the frame wall, stop means limiting movement of the drum to the latter position, said drum adapted to be displaced against the action of said spring and engaged in the cleaning liquid in said trough, and means for rotating the drum in the latter position thereof.

6. In filter apparatus, a plurality of filter units arranged in superposed horizontal rows and each unit having a rotary filtering drum adapted for bodily displacement from its normal operating position, containers for cleaning liquid arranged beneath the filtering drums, means for simultaneously displacing all of the filtering drums from their operating positions and into the cleaning liquid, and means for simultaneously rotating said drums in the latter positions thereof.

7. In filter apparatus, a series of filter members mounted for bodily movement from a normal operating position, a container for cleaning liquid arranged beneath each of the filtering members, means for simultaneously displacing all of the filtering members from their operative positions into the cleaning liquid, and means displaceable as a unit with the filtering members operable to move the individual filter members through the liquid in the containers.

8. In an air filtering apparatus, a container for cleaning liquid, and a support extending vertically above the rear side of the container, a filtering member movable through an angular path with respect to the plane of said support into and out of engagement with the front side of the support, and means sustaining said member in its operative air filtering position in engagement with the support and permitting of its bodily displacement relative thereto and into the liquid in said container.

9. In filter apparatus, an open top trough adapted to contain a cleaning liquid and a supporting wall extending vertically above the trough at the rear side thereof provided with air passages, an air filtering drum closed at one end and open at its other end, means for effecting a substantially air tight connection between the latter end of said drum and said supporting wall, and additional means mounted on the supporting wall retaining the drum in assembled relation therewith and connected with the other end of the drum at the front side of the trough, said means sustaining the drum with its axis spaced above the open top of the trough and for rotation relative to the supporting wall through the cleaning liquid.

In testimony that I claim the foregoing as my invention, I have signed my name hereto.

ALFRED M. GOODLOE.